United States Patent [19]
Sakane et al.

[11] Patent Number: 4,788,696
[45] Date of Patent: Nov. 29, 1988

[54] DECISION TIMING CONTROL CIRCUIT

[75] Inventors: Toshiaki Sakane, Nasu; Noboru Iizuka, Yokosuka; Takanori Iwamatsu, Otawara, all of Japan

[73] Assignee: Fujitsu Limited, Kawasaki, Japan

[21] Appl. No.: 63,479

[22] Filed: Jun. 18, 1987

[30] Foreign Application Priority Data

Jun. 18, 1986 [JP] Japan ............................... 61-141856

[51] Int. Cl.$^4$ .............................................. H04L 7/04
[52] U.S. Cl. ..................................... 375/111; 375/83; 375/18; 375/42; 375/718; 371/46; 371/47; 341/155
[58] Field of Search ............... 375/106, 110, 111, 118, 375/17, 18, 46, 57, 58, 80, 83, 84; 370/100; 371/5, 42, 46, 47; 340/347 N, 347 SY

[56] References Cited

U.S. PATENT DOCUMENTS

| | | | |
|---|---|---|---|
| 4,247,938 | 1/1981 | Kurihara et al. | 375/57 X |
| 4,334,312 | 6/1982 | Yoshida | 375/42 X |
| 4,602,374 | 7/1986 | Nakamura et al. | 375/17 |
| 4,663,768 | 5/1987 | Ryu | 375/84 X |
| 4,703,282 | 10/1987 | Yoshida | 375/80 X |

Primary Examiner—A. D. Pellinen
Assistant Examiner—Derek S. Jennings
Attorney, Agent, or Firm—Staas & Halsey

[57] ABSTRACT

A circuit is provided for controlling the decision timing of an A/D converter so that error rate becomes small. Error rate information is obtained based on the converted digital signal from the A/D converter. This information is used for controlling the phase of an A/D converter clock signal to thereby control the decision timing of the A/D converter.

6 Claims, 7 Drawing Sheets

FIG.5
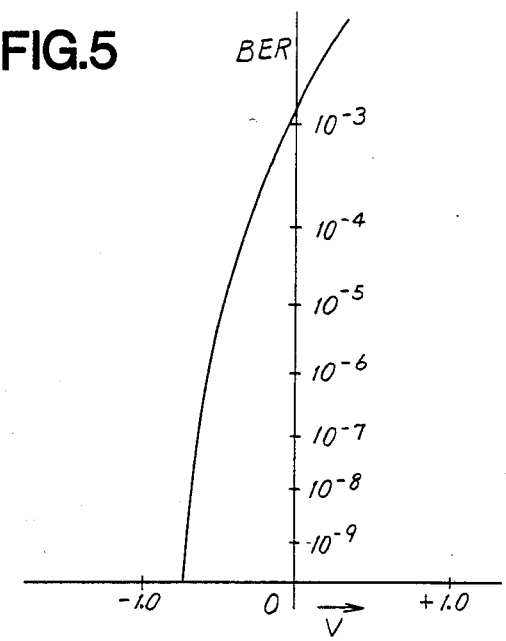
FIG.6
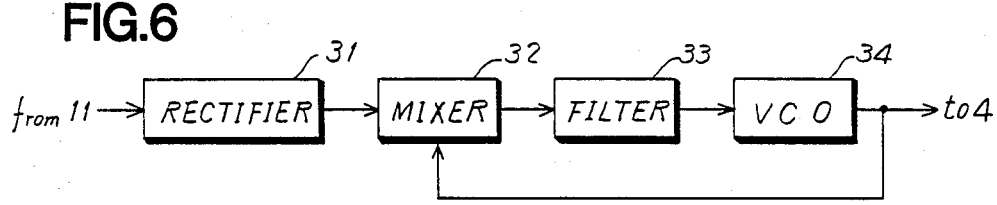
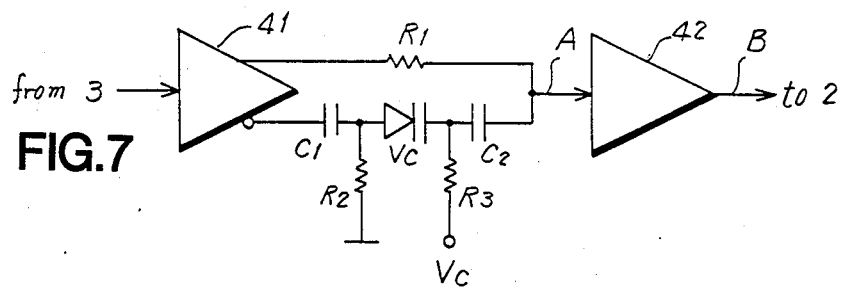
FIG.7
FIG.8A
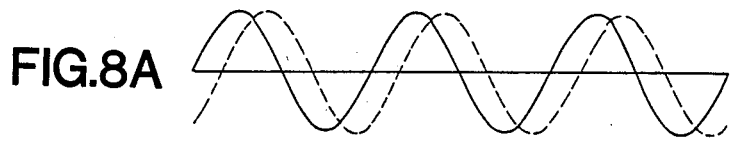
FIG.8B
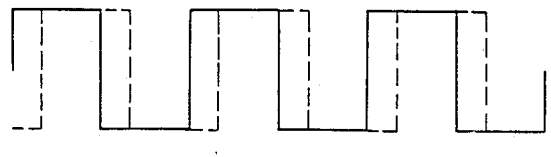

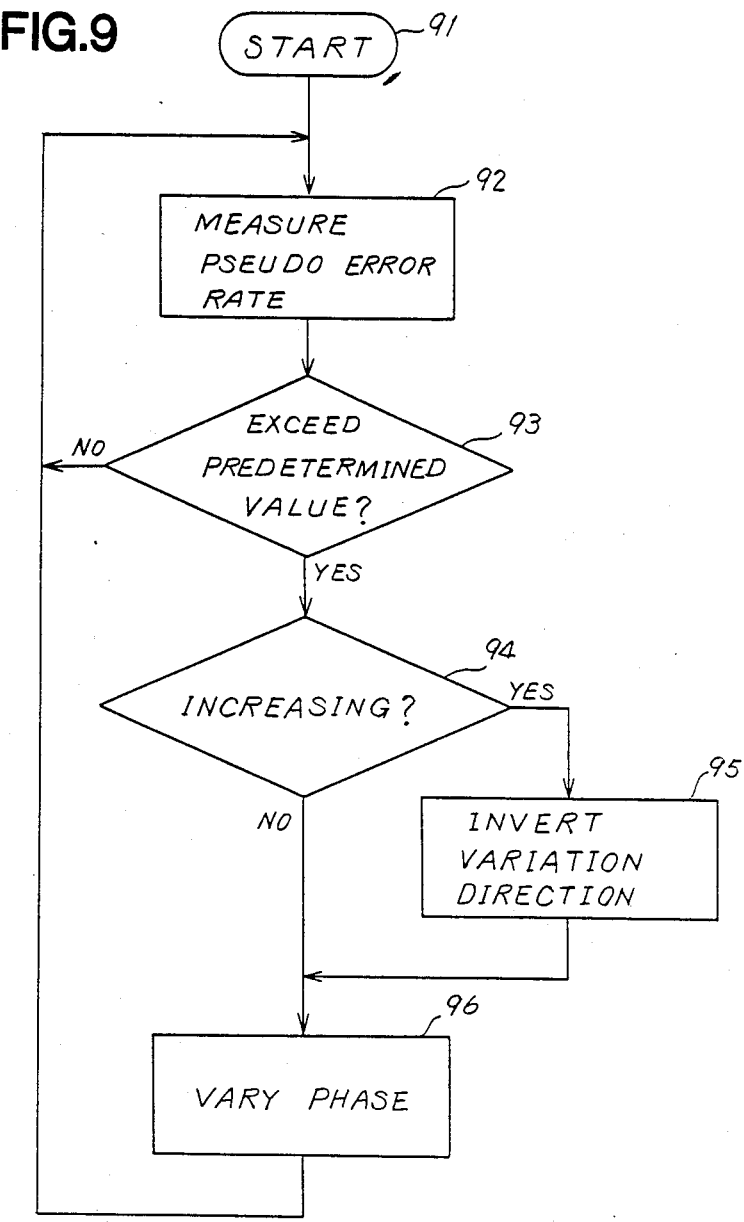

DECISION TIMING CONTROL CIRCUIT

BACKGROUND OF THE INVENTION

The present invention relates to a decision circuit and particularly to control of decision timing of a decision circuit to be used for a demodulating operation of multi-level QAM (Quadrature Amplitude Modulation) systems.

In the field of digitl radio communication, development of multi-level demodulation systems such as 16-QAM, 64-QAM and 256-QAM, etc. is continued in view of improving efficiency of frequency application. With such development, the decision error rate of a received signal rises and therefore a decision circuit must be much improved.

In the existing decision circuit, the I (inphase) signal and Q (quadrature) signal obtained by demodulating the received signal are respectively amplified and then decided by an A/D converter functioning as a decision circuit. Operation is dependent upon a clock signal which is recovered from the demodulated signal by the clock recovery circuit. The demodulated signal is then and finally converted into decision data of in I signal and Q signal. In this case, 2 bits in the case of 16-level QAM, or 3 bits in the case of 64-level QAM, or 4 bits in the case of 256-level QAM become the decision data bit output from the A/D converters for the signal channel of the I or Q signal. These A/D converters allow input of the clock signal through a phase shifter for adjustment of decision timing but this timing is initially set by manual operation for the I signal and Q signal depending on accuracy of decision of the test signal.

As explained above, since the decision circuit of the prior art has fixed the decision timing with the initially set clock phase shifter, the clock timing error becomes large and decision data error is generated even with a little fluctuation of power supply, temperature change of the receiver or a deviation between the demodulated signal and recovered clock due to deterioration of line condition. This is because the sampling time is comparatively narrow in the multi-level QAM system where band limitation is effectuated by a roll-off filter. Accordingly, the prior art has a serious problem that line quality is deteriorated.

SUMMARY OF THE INVENTION

It is an object of the present invention to provide a decision timing control circuit which assures the accurate clock timing for signal decision in spite of fluctuation of power supply, temperature fluctuation of the receiver or deterioration of line condition.

It is another object of the present invention to provide a decision timing control circuit which can directly obtain the information to be used for decision timing control from the decision circuit.

It is a further object of the present invention to provide a decision timing control circuit which stops useless control under good decision condition.

The decision timing control circuit of the present invention assures optimum decision timing by changing the decision timing in such a direction as the decision error rate becomes small, based on the information about the decision error rate of the decision circuit. As the information about decision error rate, for example, a pseudo error signal generation rate generated using the lower two bits of the decision data, namely the pseudo error rate is used. If the pseudo error rate is within the allowable range, control is not carried out.

The above and other objects and advantages of the present invention will be apparent to those skilled in the art, from the following details of construction of the present invention.

BRIEF DESCRIPTION OF THE DRAWINGS

FIG. 5 is a graph showing relation between output voltage of an integrator circuit and bit error rate BER;

FIG. 6 is a block diagram of the clock recovery circuit;

FIG. 7 is a block diagram of a variable phase shifter;

FIGS. 8A and 8B are waveforms at the points A and B in FIG. 7; and

FIG. 9 is a flowchart for a second embodiment of the present invention.

DESCRIPTION OF THE PREFERRED EMBODIMENTS

Figure 1:
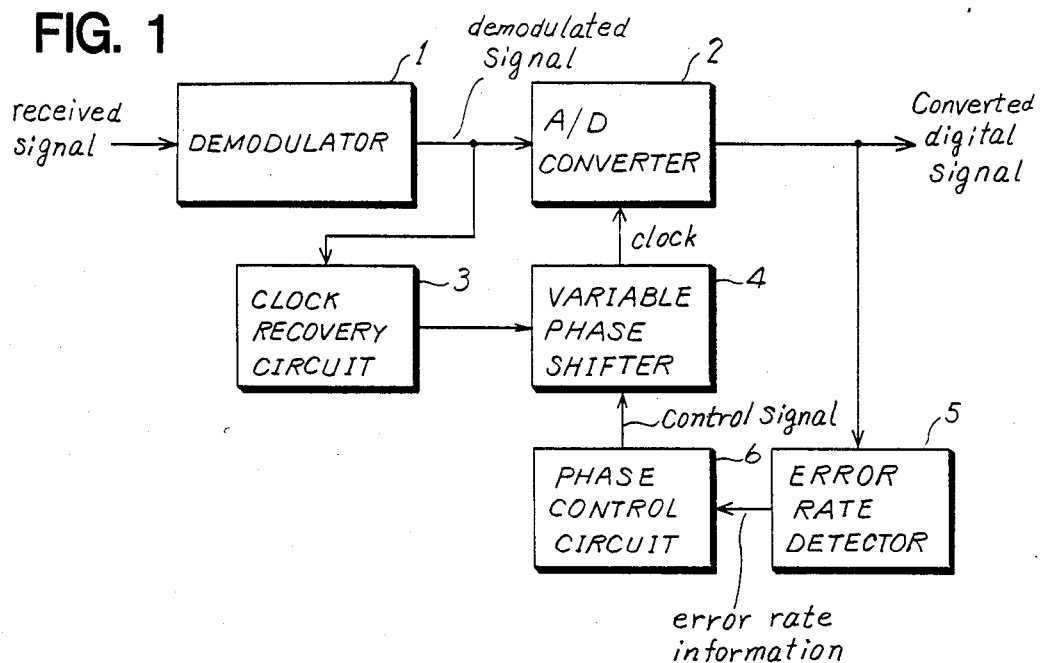
FIG. 1 is a basic block diagram of the present invention.

FIG. 1 is a basic block diagram of the present invention. In FIG. 1, a demodulator 1 inputs and demodulates the received signal and outputs a multi-level signal to an analog-to-digital converter (A/D converter) 2 and a clock recovery circuit 3. The clock recovery circuit 3 recovers the clock from the demodulated multi-level signal and applies it to the A/D converter 2 through the variable phase shifter 4. The A/D converter 2 decides the multi-level signal which is input at the timing of the given clock, converts it into the digital signal and outputs the converted digital signal. The error rate detector 5 obtains the information corresponding to error rate based on the converted digital signal and outputs error rate information to the phase control circuit 6. The phase control circuit 6 controls amount of shift of the variable phase shifter 4 so that error rate becomes good, based on the error rate information.

As the received signal, signals which change status digitally such as the ASK (Amplitude Shift Keying), PSK (Phase Shift Keying), FSK (Frequency Shift Keying) and QAM can be used. In the case of 16-level QAM, the 4-level I signal and Q signal are output respectively from the demodulator.

Figure 2A:
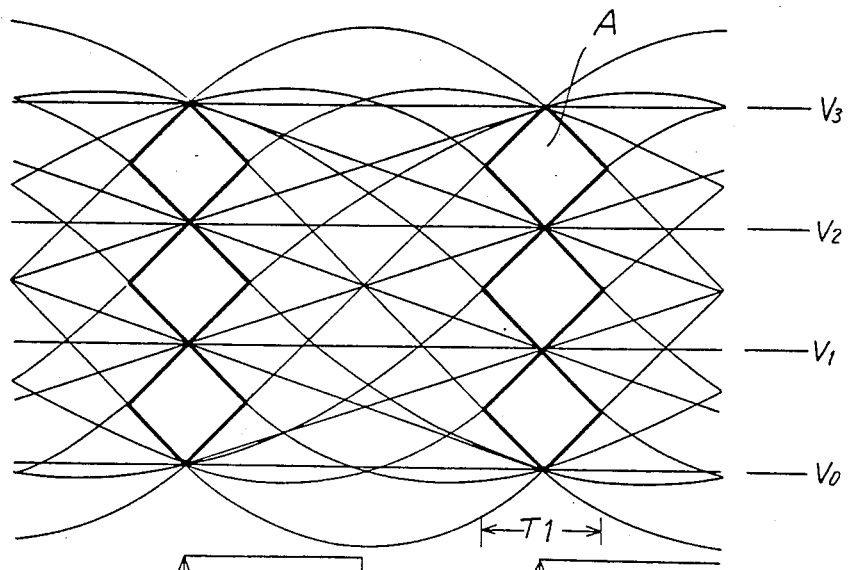
FIG. 2A is an eye pattern diagram of the 16-level QAM.
Figure 2B:
FIG. 2B is a clock waveform.
Figure 2C:
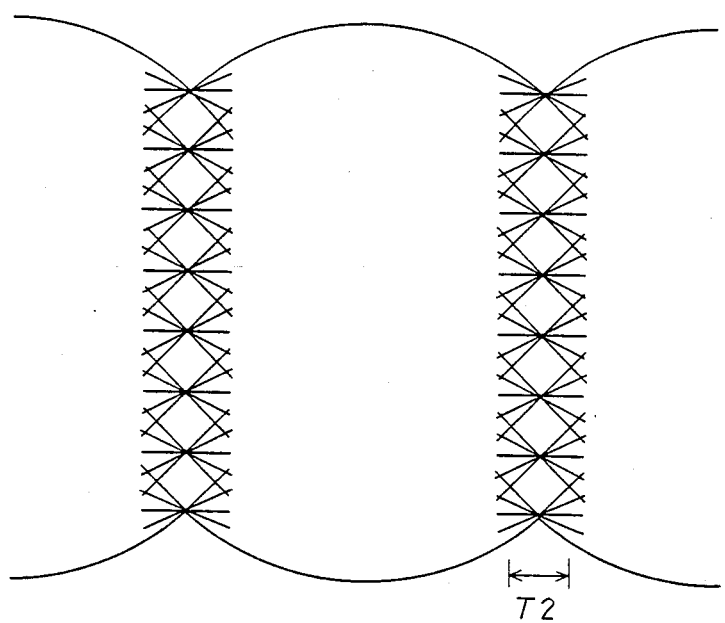
FIG. 2C is an eye pattern diagram of the 64-level QAM.
Figure 2D:
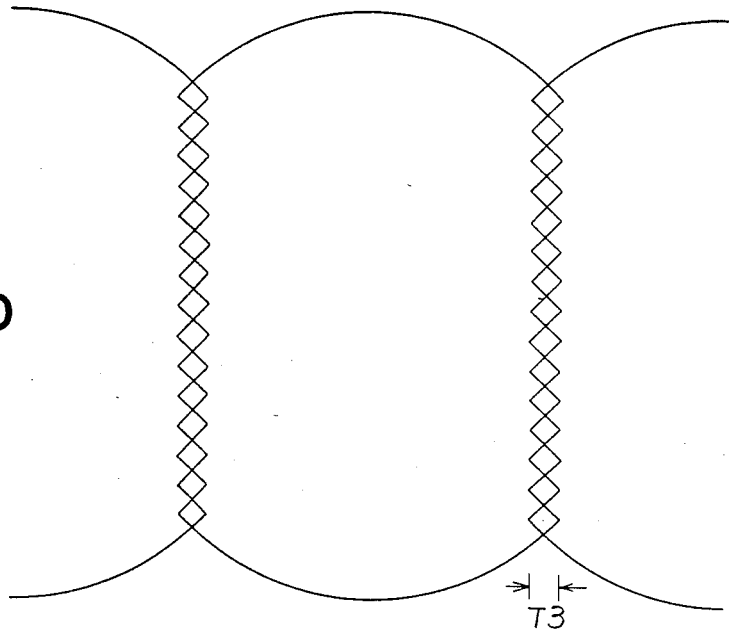
FIG. 2D is an eye pattern diagram of the 256-level QAM.

FIG. 2A is an eye pattern diagram of the demodulated multi-level signal, while FIG. 2B is the decision clock. In FIG. 2A, A is an eye aperture. The eye aperture opens when the multi-level signal is converged to the decision level $V_0$–$V_3$ at the specified timing. In FIG. 2B, an arrow mark indicates the decision timing in the A/D converter. When this decision timing is within the range of time T1 where the eye opens, decision error rarely occurs, but when the timing is out of the range, decision error often occurs. FIG. 2C, FIG. 2D respectively indicate the demodulated multi-level signals for the case of a 64 level QAM and a 256 level QAM received signal. As is indicated in these figures, the ranges of time T2, T3 where the eyes open become narrow with an increase of a number of decision levels up to 8 or 16. Accordingly, in the case of 16-level QAM, influence of variation after the initial setting may occur even when the decision timing for the initial setting is used, but in the case of 64-level QAM or 256-level QAM, such influence becomes large. Therefore, in the present invention, the decision timing is controlled to the optimum condition even after the initial setting, on the basis of the error rate information.

Figure 3:
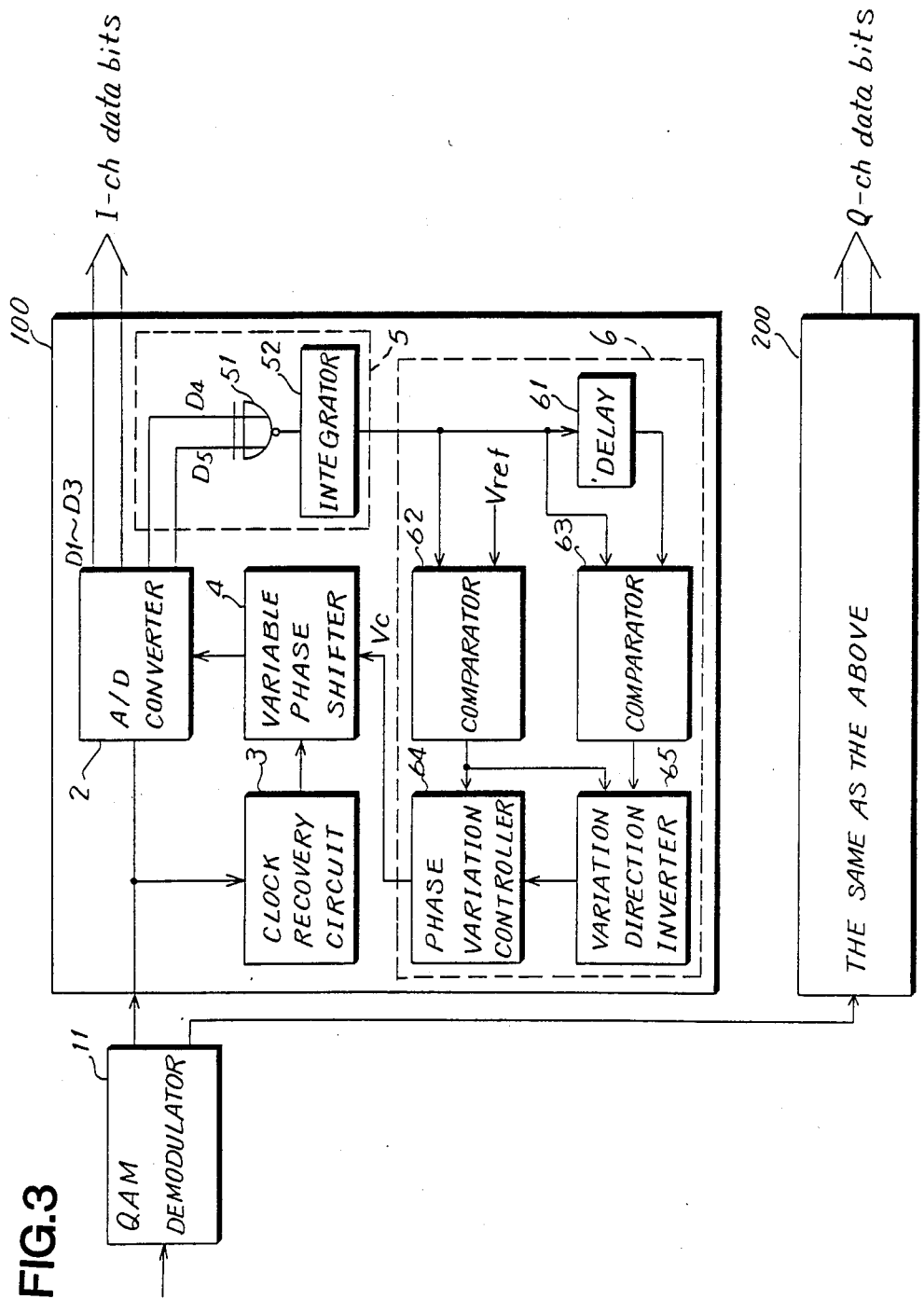
FIG. 3 is a block diagram of an embodiment of the present invention.

FIG. 3 is a block diagram of an embodiment of the present invention. The QAM demodulator 11 inputs the received signal, ouptuts the demodulated multi-level signals of the I channel and Q channel and then applies such signals respectively to the I-channel and Q-channel signal processors 100, 200 both being of the same structure.

Typical operations in the I channel will be explained hereinafter in details.

Figure 4:
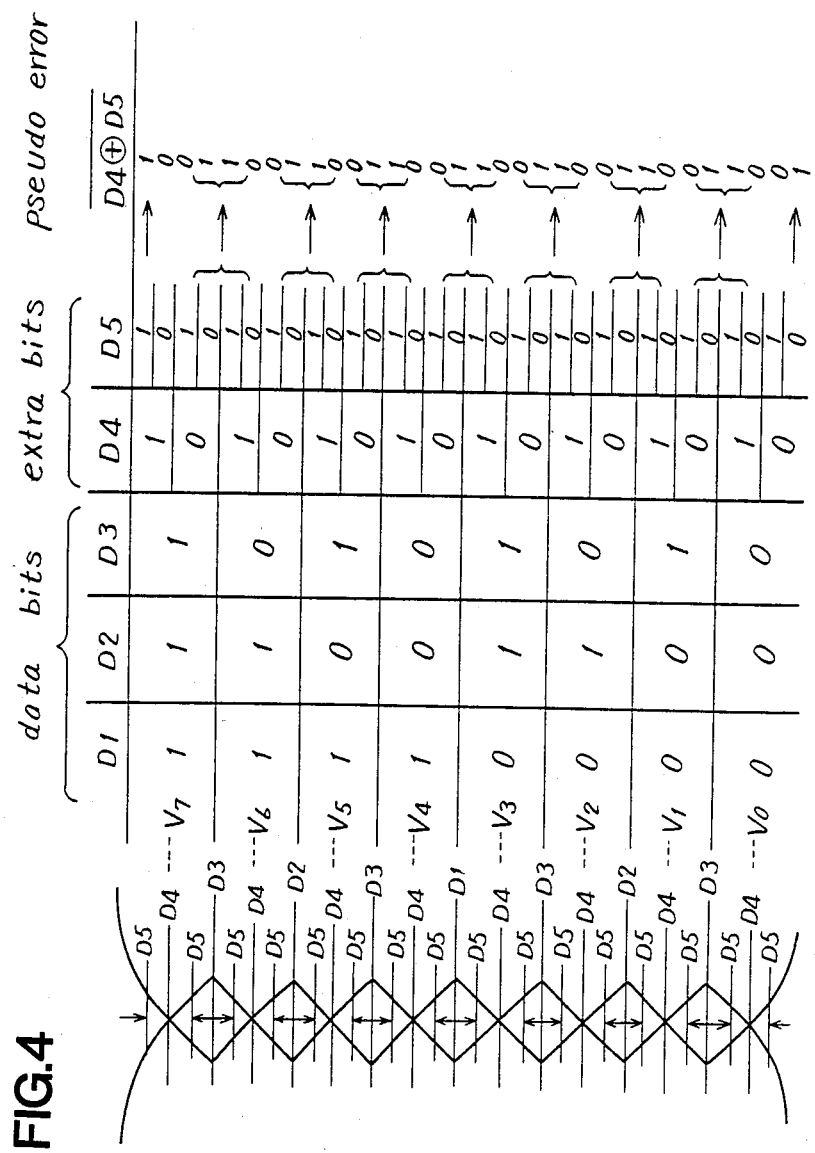
FIG. 4 indicates relation between the input and output of the A/D converter.

The A/D converter 2 outputs, in the case of the 64-level QAM, the data bits $D_1$-$D_3$ of 3 bits and th extra bis $D_4$, $D_5$ of 2 bits from the input 8-level signal as indicated in FIG. 4. The data bits have a value corresponding to the decision levels $V_0$-$V_7$ and the extra bits represent the four divided ranges of the range decided at each decision level.

The exclusive NOR circuit 51 and the integrator circuit 52 correspond to the error rate detector 5 in FIG. 1. The exclusive NOR output based on bits $D_4$ and $D_5$ from the outputs of A/D converter 2 indicates the peripheral range of the range decided at each decision level. The output of exclusive NOR circuit 51 is integrated by the integrator circuit 52 and is then output as pseudo error rate. FIG. 5 shows relation between an output voltage V of the integrator circuit 52 and actual bit error rate BER. As indicated in FIG. 5, the pseudo error rate can be used as the error information corresponding to error rate.

The part consisting of a delay circuit 61 and a comparator 62 a comparator 63, a phase variation controller 64 and a variation direction inverter 65 respectively correspond to the phase control circuit 6 of FIG. 1. The compartor 62 compares pseudo error rate from the integrator circuit 52 with a reference voltage and outputs the result of such comparison. The comparator 63 compares pseudo error rate from the integrator circuit 52 with pseudo error rate delayed through the delay circuit 61 and judges whether or not pseudo error rate has increased. The phase variation control circuit 64 varies amount of shift of the variable phase shifter 4 in the direction indicated by the variation direction inverter 65, when pseudo error rate is higher than the reference value, on the basis of an output of the comparator 62 and changes clock phase to the A/D converter 2. The variation direction inverter 65 judges that the preceding variation direction is inversed in such a case that pseudo error rate is higher than the reference value and is increasing. Thereby on the basis of outputs of the comparators 62 and 63 the variation direction inverter 65 applies inversed variation direction information to the phase change controller 64.

FIG. 6 is a block diagram indicating an example of the clock recovery circuit 3. In FIG. 6, a rectifier 31 rectifies the demodulated signal of the QAM demodulator 11 to generate the clock compoment. A mixer 32 detects phase difference between output of the VCO (Voltage Controlled Oscillator) 34 and output of rectifier 31. The detected phase difference is applied to VCO 34 through a filter 33. With this structure, VCO 34 outputs a sine wave synchronized with the demodulated signal to the variable phase shifter 4.

FIG. 7 is a block diagram indicating an example of the variable phase shifter 4. In FIG. 7, an amplifier 41 inputs the sine wave from the clock recovery circuit 3 and outputs such a direct sine wave and inverted sine wave. The direct sine wave is combined through a resistance $R_1$, while the inverted sine wave is combined through a capacitor $C_1$, variable capacitance diode VC and capacitor $C_2$. The combined signal is and then applied to a comparator 42. The comparator 42 converts the combined signal to a rectangular wave and outputs to the A/D converter as the clock for decision.

FIGS. 8A and 8B are waveforms corresponding to points A and B in FIG. 7. The variable capacitance diode VC of FIG. 7 changes capacitance depending on control voltage $V_c$ to be applied. Thereby, phase of the combined signal changes and the waveform at the point A changes, for example, to the waveform indicated by a broken line from that indicated by a solid line in FIG. 8A. With such change of the waveform at point A, the waveform at point B also changes to the waveform indicated by a broken line from that indicated by a solid line in FIG. 8B.

Figure 10:
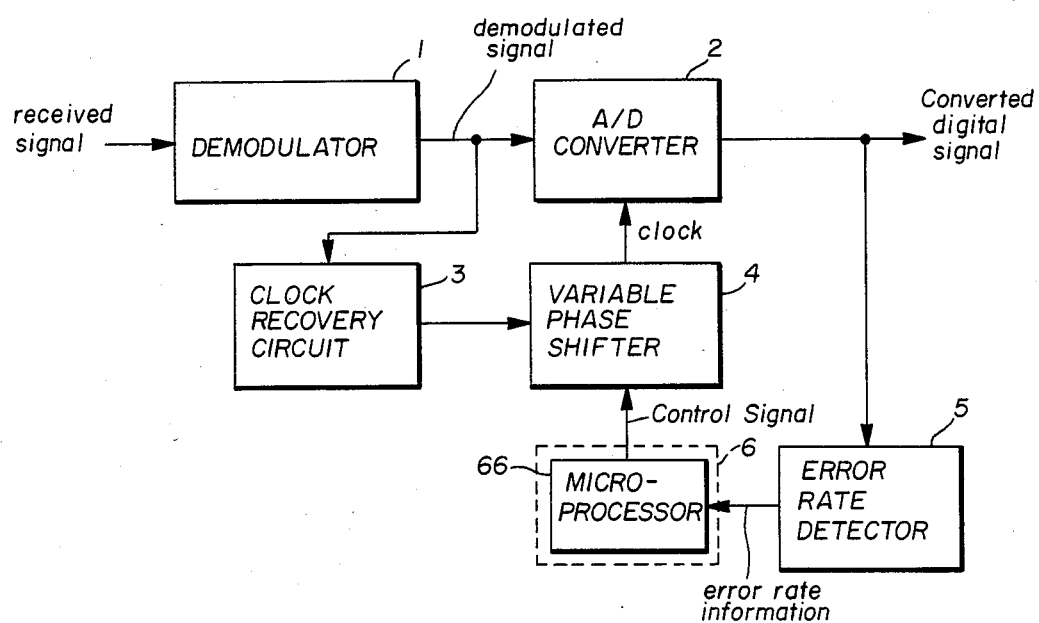
FIG. 10 is a block diagram of the second embodiment of the present invention.

The phase control function of phase control circuit 6 of FIG. 1 and FIG. 3 may be implemented by a microprocessor 66 as shown in FIG. 10. The microprocessor 66 is programmed to fetch error rate information on the basis of the pseudo error signal from the error rate detector 5 to control variable phase shifter 4. A flow chart of the program for the microprocessor 66 of FIG. 10 is shown in FIG. 9.

In FIG. 9, when operation is started with setting the power switch on (91), pseudo error rate is measured next time (92). Next, it is judged whether pseudo error rate is larger than a reference value (93). When it is under the reference value, pseudo error rate is measured (92). When it is larger than the reference value, it is then judged whether pseudo error rate has increased or not from the value of preceding measurement (94). When it has increased, the variation direction is inversed (95) and phase is varied (96), and pseudo error rate is measured next time (92). When it does not increase, phase is varied in the same direction as that in the preceding measurement (96) and pseudo error rate is again measured (92).

As the error rate information, an error rate based on parity check or error rate based on error corrected decoding can be used in place of pseudo error rate. However, since pseudo error rate can be obtained on the basis of a pseudo error signal obtained for each A/D conversion directly, pseudo error rate can respond faster to changes in a received input signal condition in comparison with the parity check and error corrected code obtained for each frame.

Moreover, control may be done in case pseudo error rate is under the specified reference value. But, in this case, the clock changes remarkably more than required, giving influence on other controls, for example, signal equalization or carrier recovery. Therefore it would be better, for example, to elongate the control period.

The many features and advantages of the present invention are apparent from the detailed specification and it is intended by the appended claims to cover all such features and advantages of the system which fall with the true spirit and scope of the invention. Further, since numerous modifications and changes will readily occur to those skilled in the art, it is not desired to limit the invention to the exact construction and operation shown and described. Accordingly all suitable modificaitons and equivalents that may be resorted to, fall within the scope of the invention.

We claim:

1. A decision timing control circuit having an actual and pseudo bit error rate, operatively connectable to receive a multi-level modulated signal having a clock signal with a phase, said decision timing control circuit comprising:

demodulation means for demodulating the multi-level modulated signal and for outputting a corresponding demodulated multi-level signal;

A/D conversion means, operatively connected to said demodulation means, for converting said demodulated multi-level signal into a corresponding digital output signal;

clock recovery means, operatively connected to said demodulation means, for recovering the clock signal from said demodulated multi-level signal and for providing a recovered clock signal output;

variable phase shifting means, operatively connected to said clock recovery means and said A/D conversion means, for phase shifting and providing said recovered clock signal to said A/D conversion means by phase shifting said recovered clock signal in accordance with a control signal;

error rate detection means, operatively connected to said A/D conversion means, for receiving said digital output signal and for generating an error rate information signal corresponding to the pseudo error rate of said digital output signal; and phase control means, operatively connected to said error rate detection means and said variable phase shifting means, for generating and providing the control signal to said variable phase shifting means to vary an amount of phase shift of said variable phase shifting means, responsive to said error rate information signal so that the actual error rate becomes small on the basis of said error rate information signal.

2. A decision timing control circuit according to claim 1, wherein said demodulation means comprises means for demodulating a multi-level QAM signal.

3. A decision timing control circuit according to claim 2, wherein:

said A/D conversion means comprises means for outputting a plurality of data bits corresponding to decision levels having ranges with two of said data bits indicating four ranges divided further from a range decided at each decision level; and said error rate detection means comprises means for integrating an exclusive NOR of the two of said data bits to generate said error rate information signal corresponding to the pseudo error rate.

4. A decision timing control circuit according to claim 3, wherein said phase control means comprises:

a delay circuit receiving said error rate information signal and generating a delayed signal;

a first comparator receiving a reference value, said error rate information signal and generating a first comparator signal to indicate whether error rate is larger than the reference value by comparing said error rate information signal to the reference value;

a second comparator operatively connected to said delay circuit, receiving said error rate information signal and generating a second comparator signal to indicate whether said error rate information signal increases by comparing said error rate information signal to said delayed signal;

a variation direction inverter operatively connected to said first and second comparators, for generating a phase variation direction inversion signal to indicate a direction of phase variation when detecting that said error rate information signal is higher than the reference value and is increasing, said variation direction inverter detecting on the basis of said first and second comparator signals;

a phase variation controller operatively connected to said first comparator and said variation direction inverter, for generating and providing the control signal to control said variable phase shifting means so that phase variation is in the direction indicated by said variation direction inverter circuit when said first comarator indicates that said error rate information signal is higher than the reference value, said phase variation controller operating on the basis of said first comparator signal and said phase variation direction inversion signal.

5. A decision timing control circuit according to claim 3, wherein said phase control means comprises a microprocessor programmed to fetch said error rate information signal and vary an amount of phase shift of said variable phase shifting means in a direction opposite to that of a preceding measurement of said error rate information signal when determining that error rate is higher than a reference value and is increasing.

6. A decision timing control circuit having an actual and pseudo error rate operatively connectable to receive a multi-level signal having a clock signal with a phase, said decision timing control circuit comprising:

A/D conversion means, operatively connectable to receive the multi-level signal, for converting the multi-level signal into a corresponding digital output signal;

clock recovery means, operatively connectable to receive the multi-level signal, for recovering the clock signal from the multi-level signal and for providing a recovered clock signal output;

variable phase shifting means, operatively connected to said clock recovery means and said A/D conversion means, for phase shifting and providing said recovered clock signal to said A/D conversion means by phase shifting said recovered clock signal in accordance with a control signal;

error rate detection means, operatively connected to said A/D conversion means, for receiving said digital output signal and for generating an error rate information signal corresponding to the pseudo error rate of said digital output signal; and phase control means, operatively connected to said error rate detection means and said variable phase shifting means, for generating and providing the control signal to said variable phase shifting means to vary an amount of phase shift of said variable phase shifting means, responsive to said error rate information signal so that the actual error rate becomes small on the basis of said error rate information signal.

* * * * *

UNITED STATES PATENT AND TRADEMARK OFFICE
CERTIFICATE OF CORRECTION

PATENT NO. : 4,788,696
DATED : November 29, 1988
INVENTOR(S) : Toshiaki SAKANE et al.

It is certified that error appears in the above-identified patent and that said Letters Patent is hereby corrected as shown below:

COLUMN 1:

line 25, delete "and", and change "in" to --an--;

line 60, "condition" should be --conditions--.

COLUMN 2:

line 1, "the" should be --an--;

line 23, "rate" should be --rate,--;

line 26, "block" should be --circuit--;

line 28, delete "and";

line 30, "invention" should be --invention;--;

line 42, "the" (second occurrence) should be --a--;

line 45, "the" (first occurrence) should be --a--;

line 57, "the" (first occurrence) should be --a--;

line 61, after "clock" insert --signal--.

COLUMN 3:

line 4, "time" should be --times--, and "T3" should be --T3,--;

line 24, "th" should be --the--;

line 62, "63" should be --63,--;

line 64, "change" should be --variation--;

line 68, "compoment" should be --component--

UNITED STATES PATENT AND TRADEMARK OFFICE
CERTIFICATE OF CORRECTION

PATENT NO. : 4,788,696

DATED : November 29, 1988

INVENTOR(S) : Toshiaki SAKANE et al.

It is certified that error appears in the above-identified patent and that said Letters Patent is hereby corrected as shown below:

COLUMN 4:

line 10, delete "such";

line 14, delete "and"; (2nd occurrence)

line 17, after "clock" insert --signal--;

line 21, after "thereby" insert --the--;

line 54, after "since" insert --the--.

Signed and Sealed this

Twenty-fifth Day of July, 1989

Attest:

DONALD J. QUIGG

Attesting Officer      Commissioner of Patents and Trademarks